(12) United States Patent
Özer et al.

(10) Patent No.: US 9,032,188 B2
(45) Date of Patent: May 12, 2015

(54) ISSUE POLICY CONTROL WITHIN A MULTI-THREADED IN-ORDER SUPERSCALAR PROCESSOR

(75) Inventors: Emre Özer, Cambridge (GB); Stuart David Biles, Suffolk (GB)

(73) Assignee: ARM Limited, Cambridge (GB)

( * ) Notice: Subject to any disclaimer, the term of this patent is extended or adjusted under 35 U.S.C. 154(b) by 1892 days.

(21) Appl. No.: 12/078,100

(22) Filed: Mar. 27, 2008

(65) Prior Publication Data

US 2008/0282067 A1 Nov. 13, 2008

(30) Foreign Application Priority Data

May 10, 2007 (GB) .................................... 0709019.4

(51) Int. Cl.
*G06F 15/00* (2006.01)
*G06F 9/30* (2006.01)
*G06F 9/40* (2006.01)
*G06F 9/38* (2006.01)
*G06F 9/48* (2006.01)

(52) U.S. Cl.
CPC ............ *G06F 9/3851* (2013.01); *G06F 9/4881* (2013.01)

(58) Field of Classification Search
None
See application file for complete search history.

(56) References Cited

U.S. PATENT DOCUMENTS

| 2001/0056456 A1* | 12/2001 | Cota-Robles ................. 709/103 |
| 2004/0216106 A1 | 10/2004 | Kalla et al. |
| 2004/0216120 A1* | 10/2004 | Burky et al. .................. 718/107 |

FOREIGN PATENT DOCUMENTS

| EP | 0 827 071 | 1/1999 |
| WO | 00/36487 | 6/2000 |
| WO | 2006/083541 | 1/2006 |

OTHER PUBLICATIONS

Moon et al. (Study of an In-order SMT Architecture and Grouping Schemes, Sep. 2003, pp. 339-350).*
UK Search Report for Great Britain Application No. 0709019.4 dated Sep. 5, 2007.
Shin et al.: "Dynamic Scheduling Issues in SMT Architectures," Apr. 22-26, 2003, IEEE, ISBN 0/7695-1926-1, pp. 77-84.

* cited by examiner

*Primary Examiner* — George Giroux
(74) *Attorney, Agent, or Firm* — Nixon & Vanderhye P.C

(57) ABSTRACT

A multi-threaded in-order superscalar processor 2 includes an issue stage 12 including issue circuitry 22, 24 for selecting instructions to be issued to execution units 14, 16 in dependence upon a currently selected issue policy. A plurality of different issue policies are provided by associated different policy circuitry 28, 30, 32 and a selection between which of these instances of the policy circuitry 28, 30, 32 is active is made by policy selecting circuitry 34 in dependence upon detected dynamic behavior of the processor 2.

47 Claims, 4 Drawing Sheets

ISSUE POLICY CONTROL WITHIN A MULTI-THREADED IN-ORDER SUPERSCALAR PROCESSOR

This application claims priority to United Kingdom Application No. 0709019.4 filed 10 May 2007, the entire contents of which are hereby incorporated by reference.

BACKGROUND OF THE INVENTION

1. Field of the Invention

This invention relates to the field of data processing systems. More particularly, this invention relates to the field of issue control within multi-threaded in-order superscalar processors whereby instructions from a plurality of program threads are selected for issue to execution units.

2. Description of the Prior Art

It is known to provide multi-threaded out-of-order superscalar processors such as the Pentium4 with HyperThreading produced by Intel Corporation. These multi-threaded out-of-order processors are capable of a high instruction throughput by reducing the occurrence of situations in which no or few instructions are issued due to data dependencies or other circumstances. However, there is a disadvantageous degree of complexity and circuit overhead associated with such multi-threaded out-of-order superscalar processors rendering them unsuitable for some applications. As an example, such processors are not well suited for use in low cost, low power systems.

A known multi-threaded in-order superscalar processor is the Porthos network processor. This provides up to 32-thread support and employs an issue policy in which one instruction from each of three threads is issued in parallel. This issue policy is relatively simple and is effective in the network processor application area which is the target of the Porthos processor, but such an issue policy is not well suited to improve the single-thread performance.

As an example, one significant potential use of multi-threaded in-order superscalar processors is in executing program instructions from multiple program threads where at least one of the program threads has a high priority and at least one of the program threads has a low priority. In this circumstance, it is desirable that program instructions from the high priority threads are issued for execution in preference to those from the low priority threads. Nevertheless, it is desirable that the number of cycles needed to execute each instruction from the low priority thread should not become too high. One way of achieving this would be to use an aggressive instruction issue policy in which issue slots are allocated by trying to issue all instructions from the high priority thread first and then trying to issue the instructions from the low priority thread if there are any available issue slots left unused by the high priority thread. However, such an approach significantly increases hardware complexity within the issue stage in a disadvantageous manner and can introduce unwanted critical timing paths which can limit the cycle time of the issue unit.

A possible issue policy for multi-threaded in-order superscalar processors when the priorities are equal is a round-robin thread issue policy. When priority differences existed between threads, then the threads can be sorted by their priorities and then the issue logic can use the round-robin policy. A pure round-robin thread issue policy will tend to degrade the performance of a high priority thread. Conversely, a round-robin issue policy based upon sorted threads can starve a low priority thread of opportunities to issue instructions and according undesirably increase the cycles-per-instruction associated with the instructions from the low priority thread.

It is desirable to provide multi-threaded in-order superscalar processors with issue circuitry capable of maintaining a good performance for a high priority thread without sacrificing too much of the performance associated with the low priority thread and without adversely impacting the issue cycle time or introducing a disadvantageous degree of hardware complexity/cost.

SUMMARY OF THE INVENTION

Viewed from one aspect the present invention provides a multi-threaded in-order superscalar processor comprising: instruction issue circuitry responsive to a selected issue policy to generate a selection of instructions to issue to respective execution units from among instructions of a plurality of program threads in accordance with said selected issue policy, said selected issue policy corresponding to an algorithm for generating said selection of instructions; and issue policy selection circuitry responsive to dynamic behaviour of said multi-threaded in-order superscalar processor to select said selected issue policy from among a plurality of issue policies.

The present invention recognises that by providing instruction issue circuitry capable of using a plurality of different issue policies and then dynamically selecting the issue policy to be used based upon the behaviour of the processor, the performance of the processor in maintaining good instruction throughput with instructions from different types of thread can be improved whilst the hardware complexity associated with the issue control need not increase to a disadvantageous degree. As an example, several relatively simple policies may be supported and switched between. With these different issue policies available the processor, it can avoid the difficulties and performance constraints which could be associated with any individual policy in certain combinations of circumstance as a different issue policy can be selected when those circumstances are detected.

It will be appreciated that the different issue policies which may be used can take a wide variety of different forms. The policies selected can be tuned to target the different types of operation and performance which it is envisaged might be encountered and desirable to provide with the processor concerned.

In one system, the plurality of program threads can include at least a high priority thread and a low priority thread and the plurality of issue policies can include a primary policy in accordance with which instructions from the high priority thread are issued in preference to instructions from the low priority thread, with no assured selection of any program instructions from the low priority thread, and a secondary policy having an assured selection of at least some instructions from the low priority thread. The primary policy can be used to boost performance associated with the high priority thread and the secondary policy can be used when it is desired to guarantee at least some issue slots are allocated to the low priority thread.

It will be appreciated that the multi-threaded nature of the processor can support many different parallel program threads. There may be more than one high priority thread and more than one low priority thread. In these circumstances, the issue circuitry can select which threads should be active in having instructions selected therefrom. This type of thread selection could also be performed at an operating system level. The present techniques are suitable for use in circumstances where there are more program threads than there are issue slots available at each cycle with an appropriate selection being made of the active threads to which the selected issue policies to be applied.

When the above-mentioned primary policy is selected, the issue circuitry may switch between a first sub-state in which no attempt is made to issue instructions from the low priority thread and a second sub-state in which an attempt is made to issue at least one instruction from the low priority thread with each set of instructions to be issued.

These different states associated with the primary policy can be switched between in dependence upon the number of instructions from the high priority thread which are available to be issued. Thus, if there is a shortage of instructions associated with the high priority thread which are available to be issued, e.g. the issue queue underflows or falls below a certain level, then the second sub-state can be adopted such that an attempt is made to issue at least one low priority thread instruction with each set of instructions being issued.

In accordance with the above described systems including a primary policy and a secondary policy, the secondary policy can act to issue at least one instruction from the high priority thread and at least one instruction from the low priority thread with each set of instructions to be issued. This is useful in circumstances where it is desirable to ensure that at least some low priority thread instructions are issued.

Switching between the primary policy and the secondary policy can be achieved in a variety of different ways. One hardware efficient and effective way of controlling the switching is when the issue policy selection circuitry accumulates a count indicative of how many consecutive instruction issue slots are not filled with an instruction from the high priority thread, and when this count reaches a first threshold value, to select the secondary policy. Thus, when the primary policy has been active and trying to issue a high number of instructions from the high priority thread, at the expense of instructions not being issued from the low priority thread, if the primary policy has not been sufficiently effective in filling all of the issue slots with instructions from the high priority thread, then a switch can be made to the secondary policy so that it will be ensured that at least some instructions from the low priority thread will be issued and utilise what might otherwise be wasted issue slots.

In order to ensure that performance of the high priority thread is not unduly reduced by the use of the secondary policy, in some embodiments the issue policy selection circuitry can serve to select the primary policy after a predetermined time of operating using the secondary policy. Thus, the primary policy can be considered to be "punished" for a lack of success in filling the issue slots with high priority instructions and then the secondary policy adopted for a predetermined period until the primary policy is reselected (e.g. after a certain number of clock cycles).

The above type of control may be conveniently provided using an N-bit saturating counter to accumulate the count with the selection of the secondary policy being made when the N-bit saturating counter saturates.

Within the context of such an embodiment the success of the primary policy in issuing multiple high priority instructions, and accordingly the appropriateness of the primary policy selection, can be recognised by arranging that when the issue circuitry issues instructions of the high priority thread in all available instruction slots within a set of instructions to be issued in parallel, the N-bit saturating counter will be reset (and thus be far from reaching the saturated state in which a policy switch will be triggered).

The switch back from the secondary policy to the primary policy can similarly be controlled using such an N-bit saturating counter by arranging that this is decremented for each processor cycle when the secondary policy is selected with a switch to the primary policy being made when the N-bit saturated counter reaches a second threshold value (e.g. zero).

Whilst it will be appreciated that the value of N can vary (and thus the amount of hysteresis provided by the control mechanisms for the policy switching), in embodiments in which up to two instructions can be issued in parallel (e.g. dual issue processors) a good balance between the high priority thread and the low priority thread can be achieved when the N-bit saturating counter is a 2-bit saturating counter.

It will be appreciated that the dynamic behaviour which is detected can have a variety of different forms. It is desirable that the detection of the dynamic behaviour is not too burdensome in order that circuit complexity and timing problems are not introduced. A good balance is achieved when the issue policy selecting circuitry comprises observation circuitry for detecting dynamic behaviour including at least attempted instruction issue outcomes associated with at least one of the policies being used (e.g. the primary policy associated with the aim of providing high performance to the high priority thread).

In different embodiments the plurality of issue policies used may comprise at least three issue policies including:

a primary policy in accordance with which instructions from said high priority thread are issued and no attempt is made to issue instructions from said low priority thread;

a secondary policy in accordance with which instructions from said high priority thread and instructions from said low priority thread are issued; and a tertiary policy in accordance with which instructions from said low priority thread are issued and no attempt is made to issue instructions from said high priority thread.

The providing of primary, secondary and tertiary policies in this way with their respective different emphasis' upon how high priority and low priority instructions are issued allows a system to be provided which is unlikely to encounter operational conditions in which a suitable issue policy for making good forward progress in the processing load is unavailable. As an example, if a high priority thread is stalled for a long period of time, then adopting the tertiary policy in which instructions are issued from the low priority thread and no attempt is made to issue instructions from the high priority thread can at least make good progress through the instructions of the low priority thread.

In the context of at least the above, the issue policy selecting circuitry operates as a state machine and includes observation circuitry for detecting the dynamic behaviour including which instruction issue slots are at least capable of being used by the high priority thread (although they might not actually be so used), with the observation circuitry triggering switches between the selected issue policies in dependence upon the detected dynamic behaviour in a manner seeking to increase issue of instructions from the low priority thread into instruction issue slots which are not capable of being used by instructions of the high priority thread. This type of state machine behaviour in controlling the issue policy selection provides a good degree of flexibility without an undue increase in circuit complexity.

The observation circuitry provided can detect the actual issue of high priority instructions into issue slots or alternatively can detect issue slots into which high priority instructions could have been issued, but were not so issued, e.g. due to a currently selected policy. Such detection of speculative behaviour whilst relatively complex does not need to be made so rapidly as to avoid an issue slot going unused by a high priority instruction and according such observation circuitry need not impact upon the cycle timing of the issue circuitry, e.g. introduce an unwanted critical path. The result of the detection by the observation circuitry can instead be used to influence the policy selection for subsequent processing cycles based upon missed opportunities to issue high performance instructions in preceding processing cycles.

As previously discussed the issue policy selecting circuitry can advantageously have a hysteresis characteristic whereby conditions favouring a switch in policy need to be maintained for a predetermined period before that switch will be made. This prevents unwanted and inappropriate too rapid switching between policies.

The issue policy selecting circuitry can include a variety of different counters employed to detect which instructions are actually issued (i.e. real behaviour) and which instructions could have been, but were not, issued (i.e. speculative behaviour). When secondary or tertiary policies are active, a primary policy speculative behaviour counter can be used to accumulate a count indicative of occurrences of a state in which selection of the primary policy would have resulted in at least a predetermined number of instructions of the high priority thread being issued if the primary policy had been selected and then triggering a switch to that primary policy when the count concerned reaches a first threshold value.

When the tertiary policy is selected a secondary policy speculative behaviour counter can be used to accumulate a similar count indicative of circumstances in which selection of the secondary policy would have resulted in successful issue of at least a predetermined number of the high priority instructions and accordingly trigger a switch to that secondary policy when the count concerned reaches a second threshold value.

A zero issue behaviour counter can count occurrences of a state in which no instructions of the high priority thread are present within the set of instructions being issued and when this reaches a third threshold value then the tertiary policy can be selected whereby the emphasis is placed upon issuing instructions from the low priority thread.

A partial issue real behaviour counter can be used to accumulate a count indicative of the circumstances in which the available issue slots are partially filled by high priority instructions and trigger a switch to the secondary policy, which is matched to such behaviour, when a fourth threshold value is reached.

A zero-issue real-behaviour counter can be used to count circumstances in which no instructions of the low priority thread are issued in a set of instructions to be issued in parallel and to trigger a switch to the primary policy when such a count reaches a fifth threshold value (in this way if low priority instruction issue is unsuccessful the state machine will at least return to the primary policy by which high priority instructions will be given most emphasis, even if they may not actually be issued).

Viewed from another aspect the present invention provides a multi-threaded in-order superscalar processor comprising: instruction issue means for generating, in response to a selected issue policy, a selection of instructions to issue to respective execution units from among instructions of a plurality of program threads in accordance with said selected issue policy, said selected issue policy corresponding to an algorithm for generating said selection of instructions; and issue policy selection means for selecting, in response to dynamic behaviour of said multi-threaded in-order superscalar processor, said selected issue policy from among a plurality of issue policies.

Viewed from a further aspect the present invention provides a method of operating a multi-threaded in-order superscalar processor, said method comprising the steps of: in response to a selected issue policy, generating a selection of instructions to issue to respective execution units from among instructions of a plurality of program threads in accordance with said selected issue policy, said selected issue policy corresponding to an algorithm for generating said selection of instructions; and in response to dynamic behaviour of said multi-threaded in-order superscalar processor, selecting said selected issue policy from among a plurality of issue policies.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
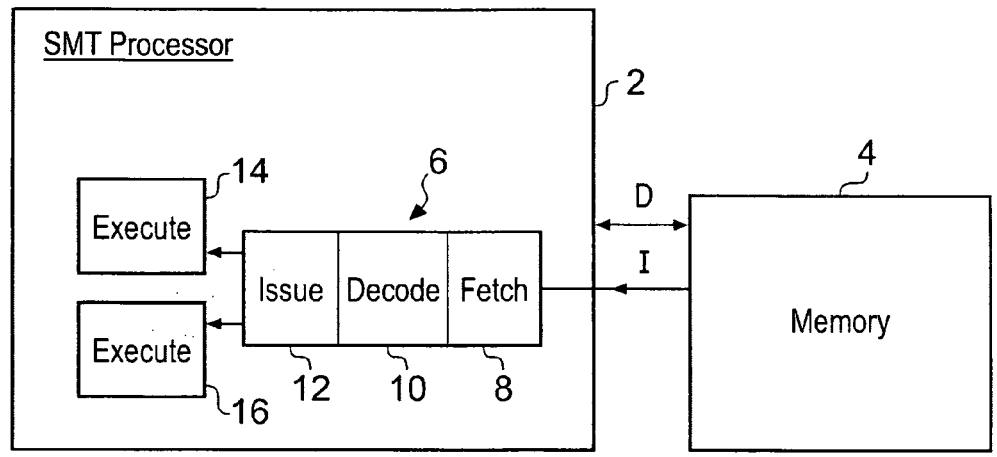
FIG. 1 schematically illustrates a multi-threaded in-order superscalar processor.

FIG. 1 illustrates a multi-threaded in-order superscalar processor 2 connected to a memory 4. The memory 4 stores data and instructions which are supplied to the processor 2. The processor 2 includes an instruction pipeline including a fetch stage 8, a decode stage 10, an issue stage 12 and two execution units 14, 16. Instructions to be executed, and drawn from multiple program threads, are fetched from the memory 4 by the fetch stage 8. After decoding in the decode stage 10, the issue stage 12 queues the instructions from the different program threads and issues these into available issue slots associated with the execution units 14, 16. In this example, the processor is capable of executing up to two program instructions in parallel (i.e. is a dual issue processor). The issue stage 12 may issue zero, one or two program instructions during each issue cycle and accordingly the set of program instructions being issued in parallel may comprise zero, one or two program instructions. This type of behaviour will be familiar to those in this technical field.

Figure 2:
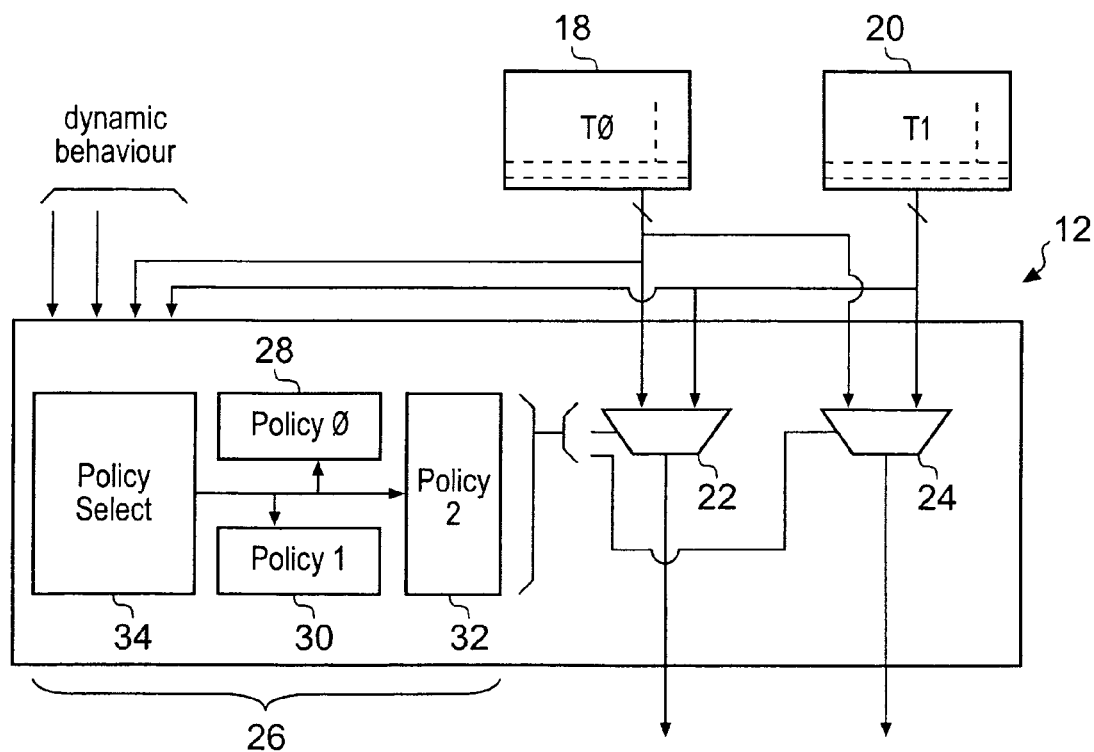
FIG. 2 schematically illustrates instruction issue circuitry and issue policy selection circuitry within the issue stage of a multi-threaded in-order superscalar processor.

FIG. 2 schematically illustrates the issue stage 12 in more detail. The issue stage 12 includes a first issue queue 18 and a second issue queue 20, each storing instructions from a respective program thread TO and Ti. Multiplexers 22, 24 select an instruction from either of the queues 18, 22 to issue in their associated issue slot. The selecting signals supplied to the multiplexers 22, 24 are generated within the issue control circuitry 26. This issue control circuitry 26 includes a plurality of hardware blocks corresponding to policy circuitry 28, 30, 32, each having an associated issue policy which is implemented thereby. The different policy circuitry 28, 30, 32 each operate in accordance with an associated algorithm as will be described later. Issue policy selecting circuitry 34 is responsive to detected dynamic behaviour of the processor 2 to generate signals to select one of the three sets of policy circuitry 28, 30, 32 to be active and to control the multiplexers 22, 24 in accordance with their associated issue policy. The individual issue policies themselves can be relatively simple, and accordingly efficiently implemented in hardware. The ability to cope with a wide variety of different circumstances using such simple policies is achieved by the issue policy selecting circuitry 34 which is responsive to the detected dynamic behaviour to select as a selected issue policy which is active at a given time from among the different policies provided by the policy circuitry 28, 30, 32.

Figure 3:
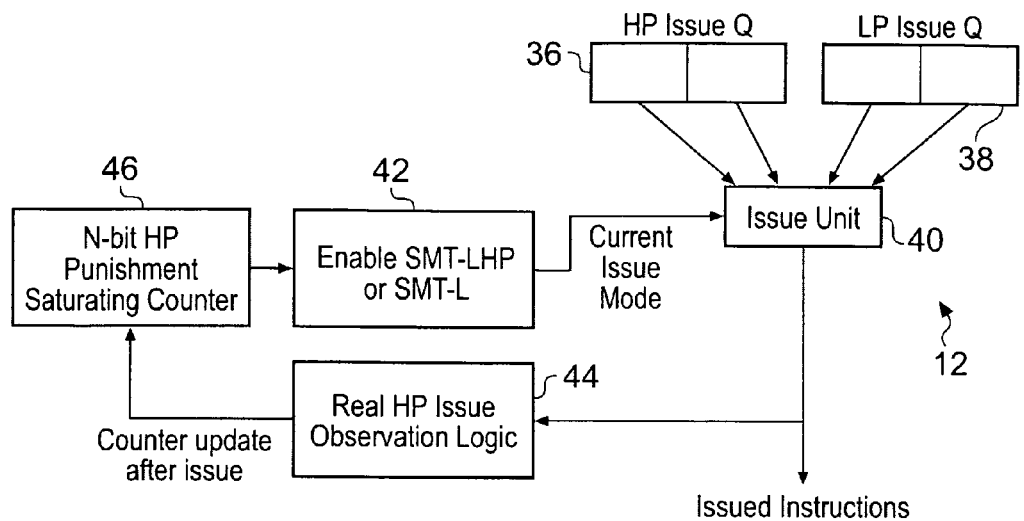
FIG. 3 illustrates a first example embodiment of circuitry for controlling issue policy selection.

FIG. 3 illustrates a first example of an issue stage 12 in accordance with the present techniques. A high priority issue queue 36 stores a queue of instructions from a currently active thread of high priority instructions. Similarly, a low priority queue 38 stores instructions from a currently active low priority thread of instructions. The selection of which of multiple high priority threads and which of multiple low priority threads which may be present are currently active and supplied to the respective queues 36, 38 may be made at an operating system level, or alternatively within the issue stage itself. The queues 36, 38 illustrated are shown with a younger and an older instruction slot and the issue unit 40 is able to select any of the four instructions corresponding to the oldest and next oldest in the high priority queue 36 and the oldest and next oldest in the low priority queue 38 for issue on to the execution units 14, 16.

This example is a dual-issue processor and accordingly zero, one or two instructions may be issued as a set of instructions issued in parallel within an issue cycle. The issue unit 40 is controlled in accordance with a currently selected issue policy. The issue policy is generated within policy circuitry 42. This policy circuitry 42 provides two potential issue policies in this example. These are a primary policy having first and second primary policy states and a secondary policy. Observation circuitry 44 detects how many high priority instructions were issued by the issue unit 40 within each set of instructions issued in parallel. The observation circuitry 44 generates a counter update signal which is supplied to an N-bit saturating counter 46, which in turn controls which of the primary policy and the secondary policy is selected by the policy circuitry 44.

The primary policy (SMT-LHP) operates in accordance with an algorithm as follows to make a static decision such that:

1. If the high priority queue 36 contains at least two instructions, then the issue unit 40 will attempt to issue those two instructions (using conventional data-dependency checking, hazard checking and other mechanisms) irrespective of whether the low priority queue 38 does or does not contain any instructions. In this case the low priority instructions will not participate in any attempt to schedule instructions, even if no instructions can be scheduled from the high priority thread. This behaviour is a first sub-state in which no attempt is made each issue cycle to issue instructions from the low priority thread. If the high priority queue 36 does not contain at least two instructions, then a second sub-state is adopted in which an attempt is made to issue one instruction from the low priority queue 38 in addition to one instruction from the high priority queue 36. It will be appreciated that, when operating in accordance with the primary policy if the system stays in the first sub-state, then there will be no assured issue of instructions from the low priority thread.

2. In accordance with a secondary policy (SMT-L) the instruction issue circuitry attempts to issue one instruction from the high priority queue 36 and one instruction from the low priority queue 38 at each issue cycle.

The observation circuitry 44 tracks how many high priority thread instructions are issued with each set of instructions issued in parallel. If two instructions from a high priority thread are issued in parallel, then the N-bit saturating counter is reset to zero. If only one instruction is issued from the high priority thread in an issue cycle, then the N-bit saturating counter 46 is incremented by one. If no instruction is issued from the high priority thread in an issue cycle, then the N-bit saturating counter 46 is incremented by 2. When the N-bit saturating counter saturates, then the policy circuitry 42 switches from implementing the primary policy (SMT-LHP) discussed above to instead implementing the secondary policy (SMT-L) discussed above. When using the secondary policy, the N-bit saturating counter is decremented by one each cycle. When the N-bit saturating counter reaches zero, then the policy circuitry 42 switches from implementing the secondary policy back to implementing the primary policy.

It will be appreciated that the N-bit saturating counter 46 can have a variety of different bit-widths. However, in the context of a dual-issue superscalar processor as illustrated, it has been found that a value of "N=2" provides a good balance between high performance thread throughput whilst not starving the low performance thread of the ability to issue instructions.

Figure 4:
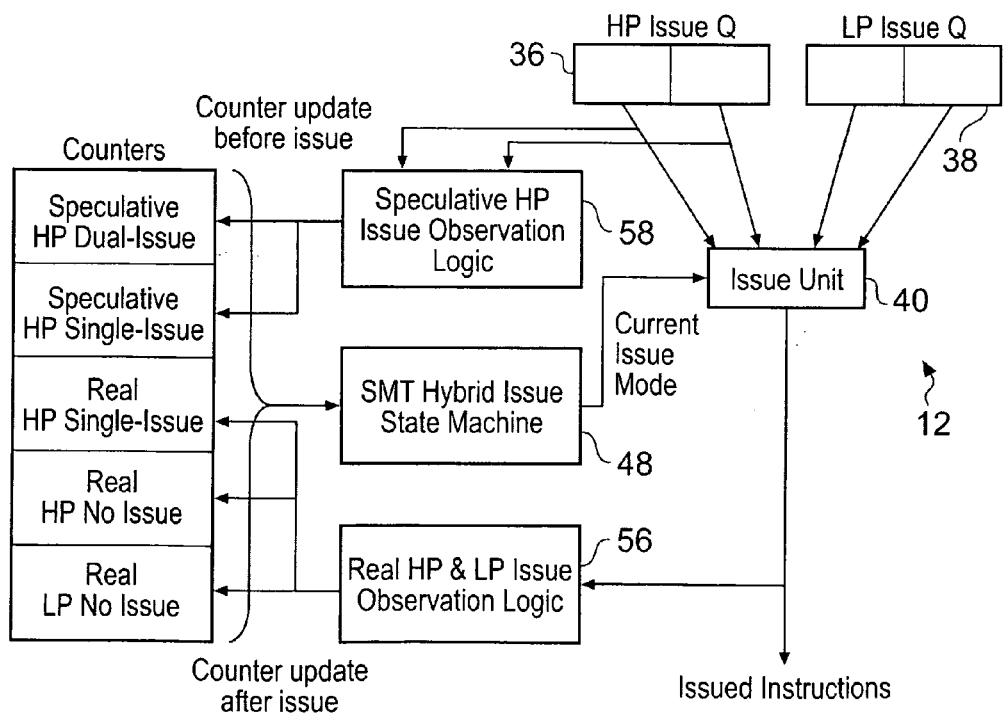
FIG. 4 illustrates a second example embodiment of circuitry for controlling issue policy selection.

FIG. 4 illustrates a second example embodiment of an issue stage 12 in accordance with the present techniques. In this example embodiment, there are provided three issue policies between which a selection is made. These are a primary policy, in accordance in which instructions from the high priority thread are issued and no attempt is made to issue instructions from the low priority thread; a secondary policy in accordance with which instructions from the high priority thread and instructions from the low priority thread are both issued with one taken from each thread at each cycle if possible; and a tertiary policy, in accordance which instructions from the low priority are issued and no attempt is made to issue instructions from the high priority thread.

Figure 5:
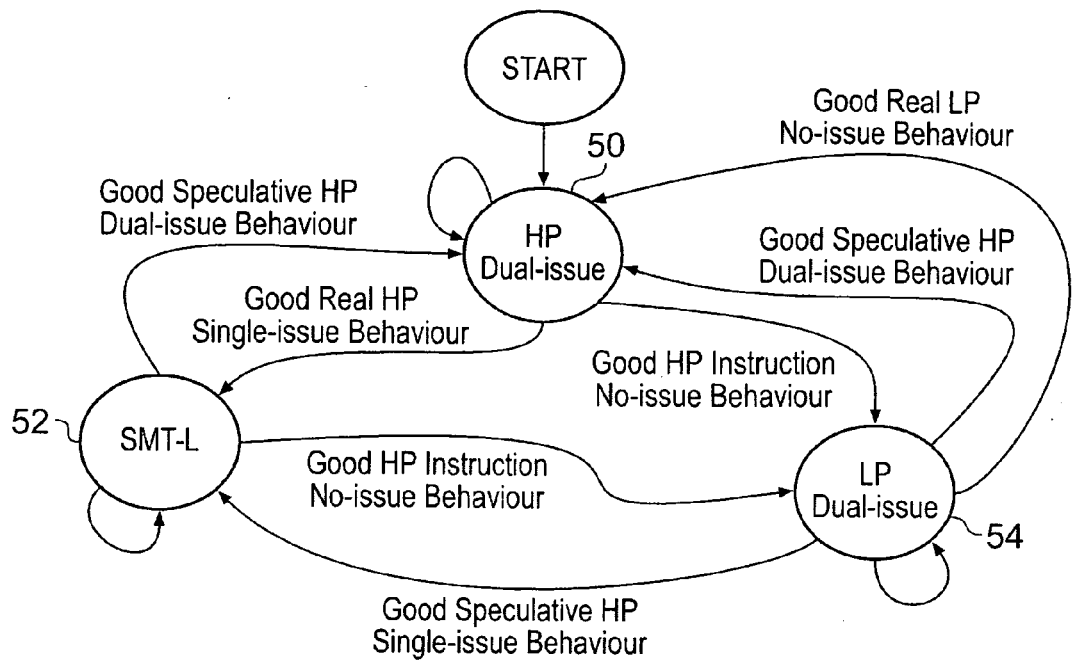
FIG. 5 is a state machine state diagram illustrating the states which may be adopted by the system of FIG. 4.

The policy circuitry 48 is a state machine with three possible states, each state corresponding to one of the above policies. This is illustrated in FIG. 5 where the primary policy corresponds to the high performance dual-issue state 50, the secondary policy correspond to the SMT-L state 52 in which at each issue cycle an attempt is made to issue one instruction from each of the two threads, and a low priority dual issue state 54 corresponding to the tertiary policy. The dynamic behaviour of the processor 2, and in this example in particular the actual or potential issue behaviour, is detected and used to control switching between these different states and accordingly which policy is currently active as a selective issue policy.

Returning to FIG. 4, this shows observation logic 56 which serves to detect the real behaviour of instructions actually being issued into the execution units 14, 16 by the issue unit 40 and in particular, whether there is a single issue of high performance instructions, an issue of no high performance instructions and an issue of no low performance instructions. The occurrence of any one of these states is used to increment an appropriate associated counter which is compared with a respective associated threshold value and in dependence thereon a trigger signal sent to the policy circuitry 48 to trigger a switch of policy as illustrated in FIG. 5. Also shown in FIG. 4 is observation circuitry 58 which is responsive to the instructions within the high performance queue 36 to determine whether zero, one or both of those instructions were capable of being issued in a given issue cycle irrespective of whether or not those instructions were actually issued in that issue cycle. The observation circuitry 58 according can be considered to detect speculative behaviour which did not necessarily take place, but which at least could have taken place if a different policy had been in force permitting such behaviour. The observation circuitry 58 has associated counters which are incremented when speculative dual issue behaviour and speculative single issue behaviour states are detected, with these counts being compared against respective predetermined thresholds to trigger generation of signals supplied to the policy circuitry 48 for controlling switching between different polices as illustrated in FIG. 5.

As shown in FIG. 5, the policy circuitry 48 is in one of the three possible states 50, 52, 54 corresponding respectively to the primary, secondary and tertiary polices. The arrows moving between the states correspond to "good" behaviour detected in a corresponding counter as illustrated in FIG. 4, with "good" behaviour corresponding to the count exceeding an associated predetermined threshold value. Thus, for example, if the policy circuitry 48 is using the primary policy of high performance dual issue corresponding to state 50 and the real high performance single issue behaviour counter exceeds a threshold value (indicating that in fact what is in practice being achieved is a large proportion of high performance single issue outcomes), then a switch will be made to the second state 52 corresponding to the secondary policy as previously discussed. The other arrows illustrated in FIG. 5 with their associated labels indicate when the counts in corresponding counters within the system of FIG. 4 reach their predetermined threshold values and accordingly trigger the associated switch to take place. It will be appreciated that the use of counters in this way, with resetting occurring upon switches or at other times, provides a degree of hysteresis within the operation of the system which avoids unduly frequent and inappropriate policy switching. The same hysteresis behaviour is associated with the N-bit saturating counter circuitry of FIG. 3.

Figure 6:
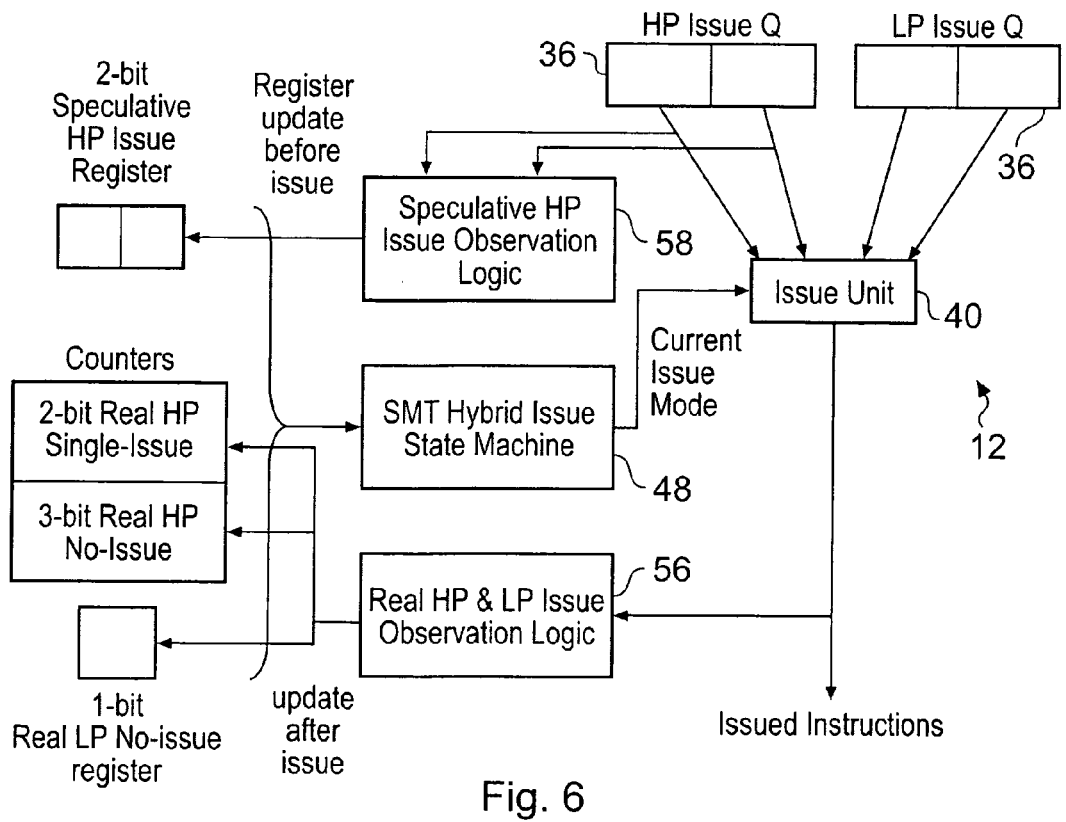
FIG. 6 is a third example embodiment of circuitry for implementing issue policy selection.

FIG. 6 illustrates a third example embodiment of an issue stage 12 modified relative to that of FIG. 4 in that the real low priority no issue counter can be a one-bit register storing a flag indicating whether or not no low priority instructions were issued in the last issue cycle with this flag being used to trigger the switch from the state 54 to the state 50 illustrated in FIG. 5 and labelled "good real LP no-issue behaviour". If the tertiary policy associated with state 54 is selected, and yet no low priority instructions are actually issued, then the system returns to the state 50 where high priority instructions will be issued as soon as they become available for issue.

In a similar way, the speculative high performance dual-issue and speculative high performance single-issue counters illustrated in FIG. 4 are replaced with a two-bit speculative high performance issue register with either zero, one or both of the bits in this register being set to indicate whether zero, one or two high performance instructions have been issued in any given issue cycle with this information being used to trigger the switches between states illustrated in FIG. 5 and the associated switches in active issue policy.

Figure 7:
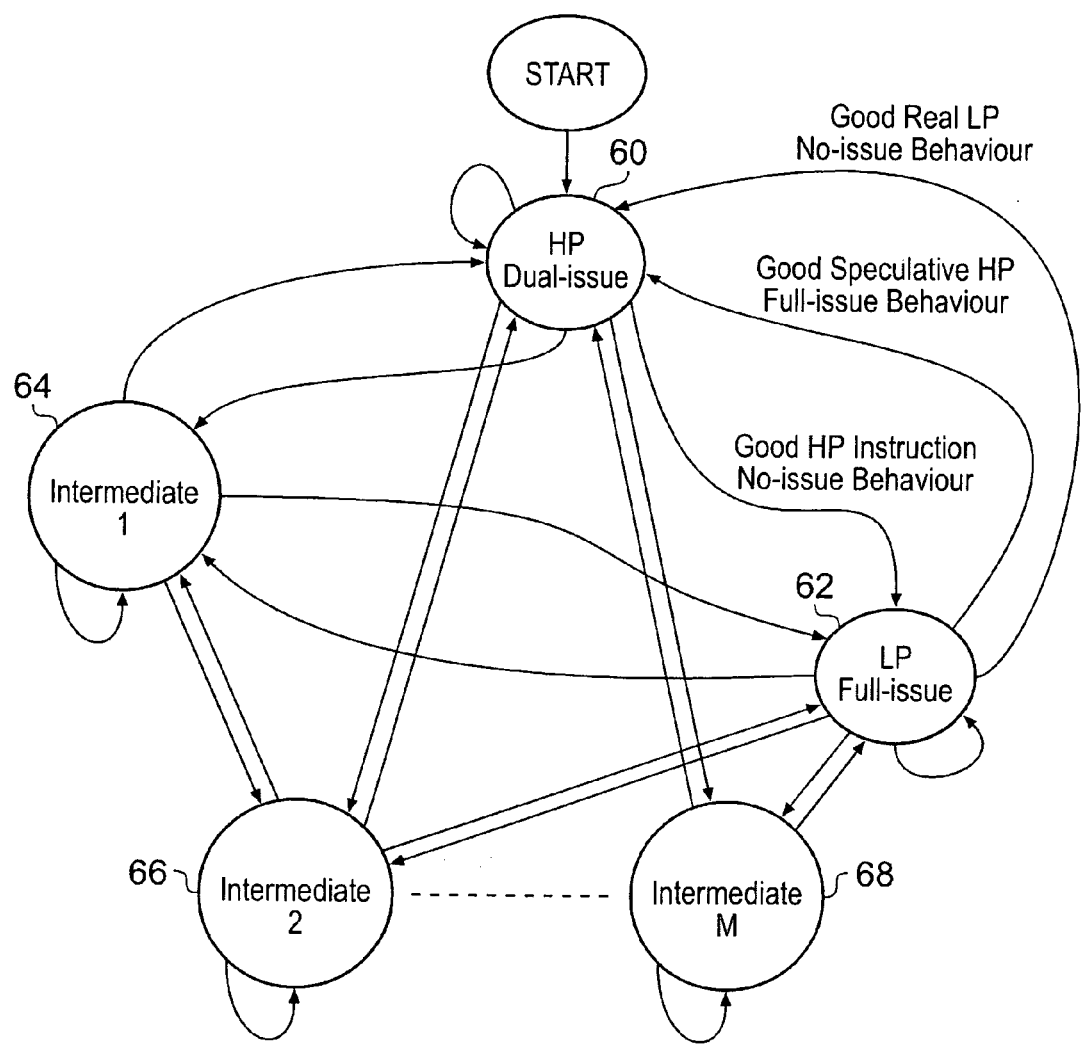
FIG. 7 is a generalised state diagram illustrating how switching between different states, each within associated issue policy, may be performed.

FIG. 7 illustrates a generalised state diagram in which an arbitrary number of different issue polices are provided and between which switches are made in dependence upon detected dynamic behaviour of the processor core 2, as tracked by various counters associated with different types of behaviour. The issue policies provided can be considered to cover a spectrum of policies ranging from a policy in which only high performance instructions are attempted to be issued in state 60 and a policy in which only low priority instructions are attempted to be issued in state 62. The various intermediate states 64, 66, 68 correspond to policies in which mixes of low priority and high priority instructions are issued in dependence upon what is possible given the instructions concerned or the current state of the processor 2. It will be appreciated that this more complex type of state behaviour would typically be associated with a superscalar processor capable of wider instruction issue (e.g. capable of issuing more instructions in parallel in any given time).

Overall it will be seen from the above that the issue stage 12 is capable of operating in accordance with a plurality of different issue policies. Each of those issue policies may themselves be relatively simple and accordingly efficiently provided by appropriate hardware. A selection between which of the policies is to be active at any given time is made by policy selecting circuitry 34 in a dynamic manner and in dependence upon the detected behaviour (e.g. real issue outcomes; speculative issue outcomes (e.g. what was possible rather than what actually took place); and/or other behaviour). This permits the selected issue policy to be changed to cope with a wide variety of different circumstances which may arise whilst not unduly burdening this system with a single complex issue policy attempting to cope with all of the different types of situations which may arise.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A multi-threaded in-order superscalar processor comprising:
   instruction issue circuitry, responsive to a selected issue policy, configured to generate a selection of instructions to issue to respective execution units from among instructions of a plurality of program threads in accordance with said selected issue policy, said selected issue policy corresponding to an algorithm for generating said selection of instructions; and
   issue policy selection circuitry, responsive to dynamic behaviour of said multi-threaded in-order superscalar processor, configured to select said selected issue policy from among a plurality of issue policies.

2. The multi-threaded in-order superscalar processor as claimed in claim 1, wherein said plurality of program threads include at least a high priority thread and a low priority thread and said plurality of issue policies include:
   a primary policy in accordance with which instructions from said high priority thread are issued in preference to instructions from said low priority thread with no assured selection of any program instructions from said low priority thread; and
   a secondary policy having an assured selection of at least some instructions from said low priority thread.

3. The multi-threaded in-order superscalar processor as claimed in claim 1, wherein said instructions issue circuitry selects which of said plurality of program threads are active and have instructions selected therefrom in accordance with said selected issue policy.

4. The multi-threaded in-order superscalar processor as claimed in claim 2, wherein, when said primary policy is selected, said instruction issue circuitry switches between a first sub-state in which no attempt is made to issue instructions from said low priority thread and a second sub-state in which an attempt is made to issue at least one instruction from said low priority thread with each set of instructions to be issued.

5. The multi-threaded in-order superscalar processor, as claimed in claim 4, wherein said instruction issue circuitry operates in said first sub-state when at least a predetermined number of instructions from said high priority thread are available for attempted issue by said instruction issue circuitry and said instruction issue circuitry operates in said second sub-state when less than said predetermined number of instructions from said high priority thread are available for attempted issue by said instruction issue circuitry.

6. The multi-threaded in-order superscalar processor as claimed in claim 2, wherein when said secondary policy is selected, said instruction issue circuitry attempts to issue at least one instruction from said high priority thread and said low priority thread with each set of instructions to be issued.

7. The multi-threaded in-order superscalar processor as claimed in claim 2, wherein, when said primary policy is selected, said issue policy selection circuitry accumulates a count indicative of how many consecutive instruction issue slots are not filled with an instruction from said high priority thread and, when said count reaches a first threshold value, said issue policy selection circuitry selects said secondary policy.

8. The multi-threaded in-order superscalar processor as claimed in claim 7, wherein, said issue policy selection circuitry selects said primary, policy after a predetermined time of operating with said secondary policy.

9. The multi-threaded in-order superscalar processor as claimed in claim 8, wherein said issue policy selection circuitry comprises an N-bit saturating counter to accumulate said count, said selection of said secondary policy being made when said N-bit saturating counter saturates.

10. The multi-threaded in-order superscalar processor as claimed in claim 9, wherein, when said primary policy is selected, if said instruction issue circuitry issues instructions of said high priority thread in all available instruction issue slots, then said issue policy selecting circuitry resets said N-bit saturating counter.

11. The multi-threaded in-order superscalar processor as claimed in claim 9, wherein said N-bit saturating counter is decremented for each processor cycle when said secondary policy is selected, said selection of said primary policy being made when said N-bit saturated counter reaches a second threshold value.

12. The multi-threaded in-order superscalar processor as claimed in claim 9, wherein said instruction issue circuitry issues up to two instructions in parallel to said execution units and said N-bit saturating counter is a 2-bit saturating counter.

13. The multi-threaded in-order superscalar processor as claimed in claim 1, wherein said issue policy selecting circuitry comprises observation circuitry for detecting said dynamic behaviour including at least attempted instruction issue outcome behaviour associated with at least one of said plurality of issue policies.

14. The multi-threaded in-order superscalar processor as claimed in claim 1, wherein said plurality of program threads include at least a high priority thread and a low priority thread and said plurality of issue policies comprise at least three issue policies including:
   a primary policy in accordance with which instructions from said high priority thread are issued and no attempt is made to issue instructions from said low priority thread;
   a secondary policy in accordance with which instructions from said high priority thread and instructions from said low priority thread are issued; and
   a tertiary policy in accordance with which instructions from said low priority thread are issued and no attempt is made to issue instructions from said high priority thread.

15. The multi-threaded in-order superscalar processor as claimed in claim 14, wherein said issue policy selecting circuitry operates as a state machine and comprises observation circuitry for detecting said dynamic behaviour including which instruction issue slots are at least capable of being used by instructions of said high priority thread, said observation circuitry triggering said issue policy selecting circuitry to switch said selected issue policy in dependence upon said detected dynamic behaviour to increase issue of instructions from said low priority thread in instruction issue slots not capable of being used by instructions of said high priority thread.

16. The multi-threaded in-order superscalar processor as claimed' in claim 15, wherein said observation circuitry detects real issue of instructions of said high priority thread to said instruction slots.

17. The multi-threaded in-order superscalar processor as claimed in claim 15, wherein said observation circuitry detects speculative behaviour identifying issue slots capable of being used by instructions of said high priority thread and which were not so used.

18. The multi-threaded in-order superscalar processor as claimed in claim 15, wherein issue policy selected circuitry is arranged such that said switching is subjected to control having a hysteresis characteristic whereby conditions favouring a switch in said selected policy are maintained for a predetermined delay period before said switch is made.

19. The multi-threaded in-order superscalar processor as claimed in claim 15, wherein said issue policy selecting circuitry includes a primary policy speculative behaviour counter coupled to said instruction issue circuitry and responsive to instructions of said high priority thread when said primary policy is not selected, to accumulate a primary policy speculative behaviour count indicative of occurrences of states in which selection of said primary policy would have resulted successful issue of at least a predetermined number of instructions of said high priority thread in accordance with said primary policy, said issue policy selecting circuitry being responsive to said primary policy speculative behaviour count reaching a first threshold value when said primary policy is not selected to trigger selection of said primary policy.

20. The multi-threaded in-order superscalar processor as claimed in claim 15, wherein said issue policy selecting circuitry includes a secondary policy speculative behaviour counter coupled to said instruction issue circuitry and responsive to instructions of said high priority thread when said tertiary policy is selected, to accumulate a secondary policy speculative behaviour count indicative of occurrences of states in which selection of said secondary policy would have resulted successful issue of at least a predetermined number of instructions of said high priority thread in accordance with said secondary policy, said issue policy selecting circuitry being responsive to said secondary policy speculative behaviour count reaching a second threshold value when said secondary policy is not selected to trigger selection of said secondary policy.

21. The multi-threaded in-order superscalar processor as claimed in claim 15, wherein said issue policy selecting circuitry includes a zero issue real behaviour counter coupled to said instruction issue circuitry and responsive to issue of instructions of said high priority thread to accumulate a zero issue behaviour count indicative of occurrences of states in which no instructions of said high priority thread are present in a set of instructions to be issued, said issue policy selecting circuitry being responsive to said zero issue real behaviour count reaching a third threshold value when said tertiary policy is not selected to trigger selection of said tertiary policy.

22. The multi-threaded in-order superscalar processor as claimed in claim 15, wherein said issue policy selecting circuitry includes a partial issue real behaviour counter coupled to said instruction issue circuitry and responsive to issue of instructions of said high priority thread to accumulate a partial issue behaviour count indicative of occurrences of states in which instructions of said high priority thread partially fill a set of instructions to be issued, said issue policy selecting circuitry being responsive to said partial issue real behaviour count reaching a fourth threshold value when said secondary policy is not selected to trigger selection of said secondary policy.

23. The multi-threaded in-order superscalar processor as claimed in claim 15, wherein said issue policy selecting circuitry includes a zero-issue real-behaviour counter coupled to said instruction issue circuitry and responsive to issue of instructions of said low priority thread to accumulate a zero issue behaviour count indicative of occurrences of states in which no instructions of said low priority thread are present in a set of instructions to be issued, said issue policy selecting circuitry being responsive to said zero issue real behaviour count reaching a fifth threshold value when said primary policy is not selected to trigger selection of said primary policy.

24. A multi-threaded in-order superscalar processor comprising:
    instruction issue means for generating, in response to a selected issue policy, a selection of instructions to issue to respective execution units from among instructions of a plurality of program threads in accordance with said selected issue policy, said selected issue policy corresponding to an algorithm for generating said selection of instructions; and
    issue policy selection means for selecting, in response to dynamic behaviour of said multi-threaded in-order superscalar processor, said selected issue policy from among a plurality of issue policies.

25. A method of operating a multi-threaded in-order superscalar processor, said method comprising the steps of:
    in response to a selected issue policy, generating a selection of instructions to issue to respective execution units from among instructions of a plurality of program threads in accordance with said selected issue policy, said selected issue policy corresponding to an algorithm for generating said selection of instructions; and
    in response to dynamic behaviour of said multi-threaded in-order superscalar processor, selecting said selected issue policy from among a plurality of issue policies.

26. The method as claimed in claim 25, wherein said plurality of program threads include at least a high priority thread and a low priority thread and said plurality of issue policies include:
    a primary policy in accordance with which instructions from said high priority thread are issued in preference to instructions from said low priority thread with no assured selection of any program instructions from said low priority thread; and
    a secondary policy having an assured selection of at least some instructions from said low priority thread.

27. The method as claimed in claim 25, comprising selecting which of said plurality of program threads are active and have instructions selected therefrom in accordance with said selected issue policy.

28. The method as claimed in claim 26, wherein, when said primary policy is selected, switching between a first sub-state in which no attempt is made to issue instructions from said low priority thread and a second sub-state in which an attempt is made to issue at least one instruction from said low priority thread with each set of instructions to be issued.

29. The method as claimed in claim 28, comprising operating in said first sub-state when at least a predetermined number of instructions from said high priority thread are available for attempted issue and operating in said second sub-state when less than said predetermined number of instructions from said high priority thread are available for attempted issue.

30. The method as claimed in claim 26, wherein, when said secondary policy is selected, attempting to issue at least one instruction from said high priority thread and said low priority thread with each set of instructions to be issued.

31. The method as claimed in claim 26, wherein, when said primary policy is selected, accumulating a count indicative of how many consecutive instruction issue slots are not filled with an instruction from said high priority thread and, when said count reaches a first threshold value, selecting said, secondary policy.

32. The method as claimed in claim 31, comprising selecting said primary policy after a predetermined time of operating with said secondary policy.

33. The method as claimed in claim 32, comprising using an N-bit saturating counter to accumulate said count, said selection of said secondary policy being made when said N-bit saturating counter saturates.

34. The method as claimed in claim 33, wherein, when said primary policy is selected, if instructions of said high priority thread are issued in all available instruction issue slots, then resetting said N-bit saturating counter.

35. The method as claimed in claim 33, wherein said N-bit saturating counter is decremented for each processor cycle when said secondary policy is selected, said selection of said primary policy being made when said N-bit saturated counter reaches a second threshold value.

36. The method as claimed in claim 33, wherein up to two instructions are issued in parallel to said execution units and said N-bit saturating counter is a 2-bit saturating counter.

37. The method as claimed in claim 25, comprising using observation circuitry to detect said dynamic behaviour including at least attempted instruction issue outcome behaviour associated with at least one of said plurality of issue policies.

38. The method as claimed in claim 25, wherein said plurality of program threads include at least a high priority thread and a low priority thread and said plurality of issue policies comprise at least three issue policies including:
    a primary policy in accordance with which instructions from said high priority thread are issued and no attempt is made to issue instructions from said low priority thread;
    a secondary policy in accordance with which instructions from said high priority thread and instructions from said low priority thread are issued; and
    a tertiary policy in accordance with which instructions from said low priority thread are issued and no attempt is made to issue instructions from said high priority thread.

39. The method as claimed in claim 38, comprising using observation circuitry to detecting said dynamic behaviour including which instruction issue slots are at least capable of being used by instructions of said high priority thread, said observation circuitry triggering switching of said selected issue policy in dependence upon said detected dynamic behaviour to increase issue of instructions from said low priority thread in instruction issue slots not capable of being used by instructions of said high priority thread.

40. The method as claimed in claim 39, wherein said observation circuitry detects real issue of instructions of said high priority thread to said instruction slots.

41. The method as claimed in claim 39, wherein said observation circuitry detects speculative behaviour identifying issue slots capable of being used by instructions of said high priority thread and which were not so used.

42. The method as claimed in claim 39, wherein said switching is subjected to control having a hysteresis characteristic whereby conditions favouring a switch in said selected policy are maintained for a predetermined delay period before said switch is made.

43. The method as claimed in claim 39, comprising using a primary policy speculative behaviour counter responsive to instructions of said high priority thread when said primary policy is not selected, to accumulate a primary policy speculative behaviour count indicative of occurrences of states in which selection of said primary policy would have resulted successful issue of at least a predetermined number of instructions of said high priority thread in accordance with said primary policy, said selecting being responsive to said primary policy speculative behaviour count reaching a first threshold value when said primary policy is not selected to trigger selection of said primary policy.

44. The method as claimed in claim 39, comprising using a secondary policy speculative behaviour counter responsive to instructions of said high priority thread when said tertiary policy is selected, to accumulate a secondary policy speculative behaviour count indicative of occurrences of states in which selection of said secondary, policy would have resulted successful issue of at least a predetermined number of instructions of said high priority thread in accordance with said secondary policy, said selecting being responsive to said secondary policy speculative behaviour count reaching a second threshold value when said secondary policy is not selected to trigger selection of said secondary policy.

45. The method as claimed in claim 39, comprising using a zero issue real behaviour counter responsive to issue of instructions of said high priority thread to accumulate a zero issue behaviour count indicative of occurrences of states in which no instructions of said high priority thread are present in a set of instructions to be issued, said selecting being responsive to said zero issue real behaviour count reaching a third threshold value when said tertiary policy is not selected to trigger selection of said tertiary policy.

46. The method as claimed in claim 39, comprising using a partial issue real behaviour counter responsive to issue of instructions of said high priority thread to accumulate a partial issue behaviour count indicative of occurrences of states in which instructions of said high priority thread partially fill a set of instructions to be issued, said selecting being responsive to said partial issue real behaviour count reaching a fourth threshold value when said secondary policy is not selected to trigger selection of said secondary policy.

47. The method as claimed in claim 39, comprising using a zero-issue real-behaviour counter responsive to issue of instructions of said low priority thread to accumulate a zero issue behaviour count indicative of occurrences of states in which no instructions of said low priority thread are present in a set of instructions to be issued, said selecting being responsive to said zero issue real behaviour count reaching a fifth threshold value when said primary policy is not selected to trigger selection of said primary policy.

* * * * *